Feb. 16, 1926.
E. B. HEYD
1,573,493
DRILL FOR FERTILIZERS AND SEEDS
Filed July 2, 1925
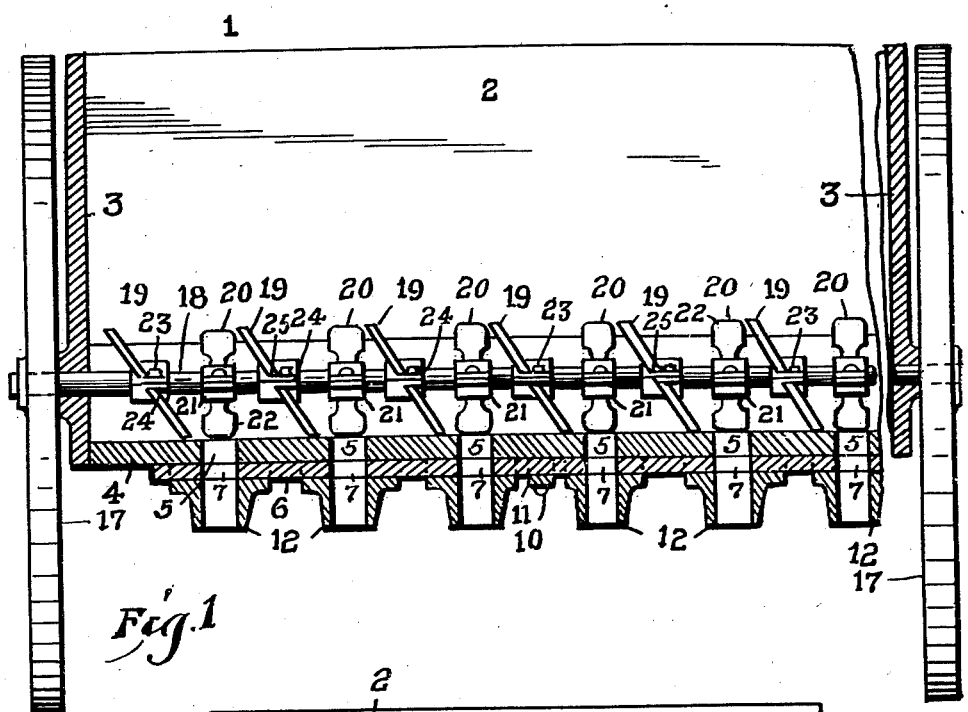
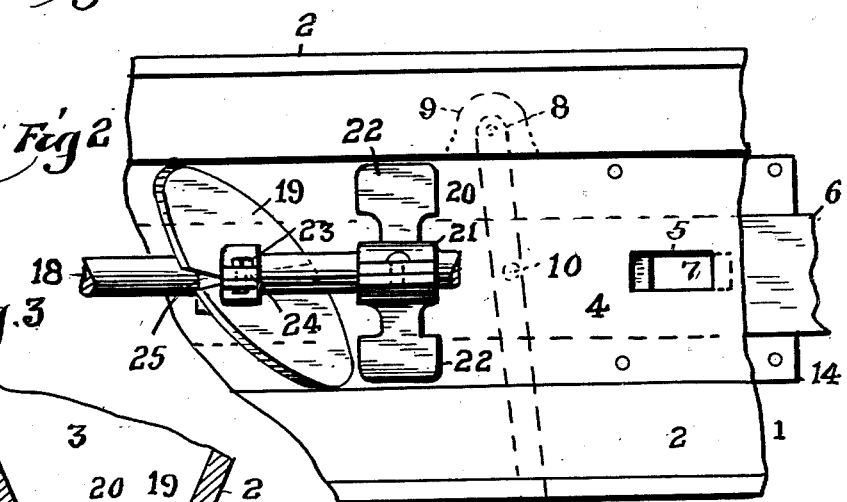
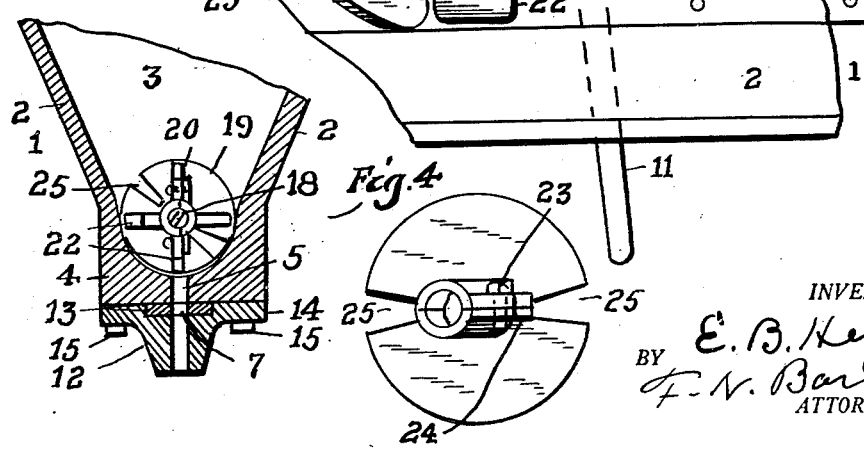
INVENTOR.
BY E. B. Heyd
F. N. Barber
ATTORNEY.

Patented Feb. 16, 1926.

1,573,493

UNITED STATES PATENT OFFICE.

ESLER B. HEYD, OF GARRETTSVILLE, OHIO.

DRILL FOR FERTILIZERS AND SEEDS.

Application filed July 2, 1925. Serial No. 41,027.

*To all whom it may concern:*

Be it known that I, ESLER B. HEYD, a citizen of the United States, residing at Garrettsville, in the county of Portage and State of Ohio, have invented new and useful Improvements in Drills for Fertilizers and Seeds, of which the following is a specification.

My invention relates to drills for planting wheat, oats, corn, and other seeds and for distributing lime, land-plaster, and other fertilizers.

The object of the invention is to provide a novel and efficient agitator and feed for drills of the type just mentioned It is advantageous to provide some means for agitating the material to be distributed by the drill in order to prevent its bridging over the discharge openings for the material. I prefer to have the agitating means close to bottom of the distributing box so as to ensure that the discharge openings shall be kept clear of obstructions and supplied with a practically uniform and continuous supply of seed fertilizer.

Referring to the accompanying drawing, Fig. 1 is a view showing the distributing box, the feed tubes and the feed-regulating slide in vertical section, and the other parts in front elevation; Fig. 2, a plan view of a portion of the drill, parts being broken away; and Fig. 3, a cross-section of Fig. 1, parts being broken away. Fig. 4 is a plan view of one of the agitators 19.

On the drawings, I have shown only a portion of a drill, the usual draft mechanism and the hoes and their controlling devices being omitted. 1 designates the box or container for the material to be drilled or distributed. It has the sides 2, the ends 3, and the trough-shaped bottom 4 provided at suitable intervals with the vertical discharge openings 5, elongated parallel with the sides 2.

6 is a feed-regulating slide movable longitudinally on the lower side of the bottom 4 and having the openings 7 adapted to register with the openings 5. The slide is moved by the lever 11 having one end pivoted at 8 on a bracket 9 and an intermediate part pivoted at 10 to the slide. The slide slides on the feed-tubes 12, each having a recess 13 (see Fig. 3) in its upper end to receive the slide, the recess being as deep as the slide is thick, so that the feed-tubes may hold the slide in contact with the bottom of the box 1 and prevent any loose movement of the slide. The feed-tubes have lateral lugs 14 through which the bolts 15 pass to secure them to the box 1.

The box 1 is supported at each end by a wheel 17 connected to the axle or shaft 18, whose axial center lies in the axial center of the trough-like bottom 4. On the shaft 18 is secured a number of agitating or feeding devices 19 for the material to be drilled. Each device 19 is oblong or elliptical in shape having its shortest half axis equal to the radius of the trough or to the distance from the axial center of the shaft to the bottom of the trough. The longest axis of each device 19 is such that when this axis is vertical, as in Figs. 1 and 3, its lower extremity will just touch the bottom of the trough. The portions of each device between the said axes are shaped to just touch the bottom and sides of the trough as they pass beneath the axis of the shaft 18 from one side of the trough to the other Each device 19 is inclined to the shaft preferably so as to cause the extremities of its longest axis to sweep longitudinally of the trough a length about equal to the distance between consecutive openings 5.

Between consecutive devices 19 the shaft 18 is provided with other agitating and feeding devices 20 each of which comprises a hub 21 provided with a number of radially arranged blades or paddles 22, whose ends pass close to the inner surface of the trough 4 and sweep across an opening 5, whereby the material in the box 1 is agitated and fed downwardly to each opening 5.

The feed devices 19 are preferably made in halves secured to the shaft by bolts 23 passing through projections 24 on the halves, and the adjacent edges of the halves are separated by the spaces 25, so that some of the material in the box may pass through the same and thereby provide additional feed to points below the devices 19.

As the drill is drawn on the wheels 17, the shaft 18 and the feed-devices 19 and 20 are rotated. The devices 19 agitate the material in the box and sweep it back and forth between the openings, down which it falls in streams limited by the longitudinal adjustment of the slide 6 in a manner well known. The feed-devices 19 having considerable inclination to the shaft, for example, about 45 degrees, feed the material to the feed-devices 20. The devices 19 sweep the bottom of the box clean between the consecutive feed-openings 5, while the devices 20 sweep the material over the said openings without feeding any material portion beyond them.

I claim:

1. In a drill for grain or fertilizer, a box to contain the material to be drilled and having discharge openings in its bottom, a rotatable shaft in the box, a plurality of oblong feeding devices secured to the shaft and inclined to the shaft, the said feeding devices being arranged between consecutive discharge openings, and other feeding devices carried by the shaft between successive members of the first feeding devices and sweeping across and close to the said openings, the first feeding devices being arranged to sweep the said material into the path of adjacent second feeding devices on either side thereof.

2. In a drill for grain or fertilizer, a box to contain the material to be drilled and having discharge openings in its bottom, a rotatable shaft in the box, a plurality of oblong feeding devices secured to the shaft, the said feeding devices being arranged between consecutive discharge openings, and each having a sweep longitudinally of the shaft of about the distance between consecutive discharge openings, and other feeding devices carried by the shaft between successive members of the first feeding devices, the first feeding devices being arranged to sweep the said material into the path of adjacent second feeding devices on either side thereof.

3. In a drill for grain or fertilizer, a box to contain the material to be drilled and having discharge openings in its bottom, a rotatable shaft in the box, a plurality of oblong feeding devices secured to the shaft and inclined to the shaft, the said feeding devices being arranged between consecutive discharge openings, and other feeding devices carried by the shaft between successive members of the first feeding devices and sweeping across and close to the said openings, the first feeding devices arranged to sweep the said material into the path of adjacent second feeding devices on either side thereof, the first feeding devices having radial openings for the passage of some of said material.

4. In a drill for grain or fertilizer, a box to contain the material to be drilled and having discharge openings in its bottom, a rotatable shaft in the box, a plurality of oblong devices secured to the shaft and inclined to the shaft, the said feeding devices being arranged between consecutive discharge openings and each having a sweep longitudinally of the shaft of about the distance between consecutive discharge openings, and other feeding devices carried by the shaft between successive members of the first feeding devices, the first feeding devices arranged to sweep the said material into the path of adjacent second feeding devices on either side thereof, the first feeding devices being made in halves with spaces between the halves.

In testimony whereof, I hereunto affix my signature.

E. B. HEYD.